(12) United States Patent
Ananthapur Bache et al.

(10) Patent No.: US 10,574,644 B2
(45) Date of Patent: Feb. 25, 2020

(54) STATEFUL SESSION MANAGER

(71) Applicant: INTERNATIONAL BUSINESS MACHINES CORPORATION, Armonk, NY (US)

(72) Inventors: Vijay Kumar Ananthapur Bache, Karnataka (IN); Vijay Ekambaram, Tamilnadu (IN); Saravanan Sadacharam, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 15/585,281

(22) Filed: May 3, 2017

(65) Prior Publication Data

US 2018/0324173 A1 Nov. 8, 2018

(51) Int. Cl.
*G06F 21/00* (2013.01)
*H04L 29/06* (2006.01)
(Continued)

(52) U.S. Cl.
CPC ...... *H04L 63/0815* (2013.01); *H04L 63/0807* (2013.01); *H04L 63/10* (2013.01); *H04L 67/02* (2013.01)

(58) Field of Classification Search
CPC .. H04L 63/0815; H04L 63/0807; H04L 63/10
See application file for complete search history.

(56) References Cited

U.S. PATENT DOCUMENTS 7,437,594 B1  10/2008  Mount et al.
8,775,850 B2   7/2014  Moy
(Continued)

FOREIGN PATENT DOCUMENTS

| EP | 2151090 A1 | 2/2010 | |
|---|---|---|---|
| GB | 2502739 B * | 4/2014 | ............ G06F 21/62 |
| WO | WO2011139963 A2 | 11/2011 | |

OTHER PUBLICATIONS

Italo Dacosta, Saurabh Chakradeo, Mustaque Ahamad, Patrick Traynor; "One-time cookies: Preventing session hijacking attacks with stateless authentication tokens"; Jul. 2012; ACM Transactions on Internet Technology (TOIT): vol. 12 Issue 1, Jun. 2012 Publisher: ACM; pp. 1-24 (Year: 2012).*

(Continued)

*Primary Examiner* — Kendall Dolly
*Assistant Examiner* — Courtney D Fields
(74) *Attorney, Agent, or Firm* — Patrick J. Daugherty; Daugherty & Del Zoppo Co., LPA

(57) ABSTRACT

Computer processors are configured to verify a unique user identification credential for a requesting user of a first client in response to receiving request for access to a microservice process from the user via the first client; create a client identification token in response to verifying a unique user identification credential for the user, and a session identification token for the request; pass the session identification token to the requesting client mapped to the client identification token; enable requested access by the first client to the requested microservice process in association with the session identification token in a session that is persisted to a session repository identified by the session identification token; and cause the requesting client to replicate the persisted session in association with the session identification token.

17 Claims, 4 Drawing Sheets

(51) Int. Cl.
*G06F 21/62* (2013.01)
*G06F 21/31* (2013.01)
*H04L 29/08* (2006.01)

(56) References Cited

U.S. PATENT DOCUMENTS

| | | | |
|---|---|---|---|
| 8,812,601 | B2 | 8/2014 | Hsieh |
| 8,819,798 | B2 | 8/2014 | Zises |
| 9,043,391 | B2 | 5/2015 | Husain et al. |
| 9,413,758 | B2 | 8/2016 | McDonough et al. |
| 9,948,729 | B1 | 4/2018 | Ekambaram et al. |
| 2009/0100438 | A1 | 4/2009 | Hinton et al. |
| 2013/0080525 | A1 | 3/2013 | Aoki et al. |
| 2014/0359735 | A1 | 12/2014 | Lehmann et al. |
| 2015/0088978 | A1* | 3/2015 | Motukuru ............. H04L 67/148 709/203 |
| 2015/0089604 | A1* | 3/2015 | Mathew ................ H04L 67/141 726/5 |
| 2016/0381000 | A1* | 12/2016 | Mathew .............. H04L 63/0815 726/4 |
| 2017/0041374 | A1 | 2/2017 | Rakshit |

OTHER PUBLICATIONS

Peter Mell et al, The NIST Definition of Cloud Computing, National Institute of Standards and Technology, Publication 800-145, 2011.
Anthony B. Ferguson et al, Session management server: Session transitions and state, developerWorks, IBM Corporation, 2007.
Eric Horowitz, Eyes Don't Lie: A New Way to Use Gaze Tracking in the Classroom, EdSurge, 2015.
Niall Firth, Eye-tracker lets you drag and drop files with a glance, Daily News, 2013.
Jayson Turner et al, Cross-device gaze-supported point-to-point content transfer, ACM DL Digital Library, 2014.

* cited by examiner

STATEFUL SESSION MANAGER

BACKGROUND

A web session is a management structure used to maintain state data for a user across a variety of different Hypertext Transfer Protocol (HTTP) connections accessed through internet networking devices. Generally, implementing web session state management includes maintaining a client-side session identifier and a server-side session table. Client-side session identifiers, such as a cookie stored in a browser, are generally included by an HTTP client as part of each HTTP request and provide a server with a consistent identifier for a particular HTTP client across multiple connections. Server-side session tables are typically implemented as a hash table in server code that binds an HTTP client identifier to a set of information established by the client on a prior HTTP connection, and wherein the table may bind a browser user's current HTTP connection to a previous connection.

"Microservices" implementation approaches for service-oriented architectures (SOA) build flexible software systems ("services") for stateless implementation on heterogeneous back-end (server-side) systems. Services in a microservice architecture are generally small granularity processes that are independently deployable and use lightweight, technology-agnostic protocols to communicate with each other over a network in order to fulfill a single, client-side data request or other goal. For example, within one session a user client may submit a single request for identity and job title information for a member of an organization, wherein the request is satisfied by a first back-end microservice that retrieves personal information from a human resources database, and by a different, second back-end microservice that retrieves job description data from an organizational hierarchy database that is organized by job title.

By distributing different server-side processing responsibilities into different smaller services, microservice architecture enhances cohesion and decreases coupling, making it easier to change and add functions and qualities to the system at any time. Microservice architecture enables the structure of an individual back-end service to be independently changed and developed by a service provider over time through continuous refactoring, without required corresponding time and resources to be expended on others of the microservices, thereby reducing the need to allocate resources to up-front design processes, and enabling early and continuous releasing of different software versions.

SUMMARY

In one aspect of the present invention, a computerized method for federated session management includes executing steps on a computer processor. Thus, a computer processor is configured to verify a unique user identification credential for the user for a requesting first client in response to receiving a first request for access to a microservice process from the user via the first client; create a client identification token in response to verifying the unique user identification credential for the user for the requesting first client; create a session identification token for the request; map the session identification token to the client identification token; pass the session identification token to the requesting client mapped to the client identification token; enable requested access by the first client to the requested microservice process in association with the session identification token in a session that is persisted to a session repository identified by the session identification token; and cause the requesting client to replicate the persisted session in association with the session identification token.

In another aspect, a system has a hardware processor in circuit communication with a computer readable memory and a computer-readable storage medium having program instructions stored thereon. The processor executes the program instructions stored on the computer-readable storage medium via the computer readable memory and is thereby configured to verify a unique user identification credential for the user for a requesting first client in response to receiving a first request for access to a microservice process from the user via the first client; create a client identification token in response to verifying the unique user identification credential for the user for the requesting first client; create a session identification token for the request; map the session identification token to the client identification token; pass the session identification token to the requesting client mapped to the client identification token; enable requested access by the first client to the requested microservice process in association with the session identification token in a session that is persisted to a session repository identified by the session identification token; and cause the requesting client to replicate the persisted session in association with the session identification token.

In another aspect, a computer program product for federated session management has a computer-readable storage medium with computer readable program code embodied therewith. The computer readable hardware medium is not a transitory signal per se. The computer readable program code includes instructions for execution which cause the processor to verify a unique user identification credential for the user for a requesting first client in response to receiving a first request for access to a microservice process from the user via the first client; create a client identification token in response to verifying the unique user identification credential for the user for the requesting first client; create a session identification token for the request; map the session identification token to the client identification token; pass the session identification token to the requesting client mapped to the client identification token; enable requested access by the first client to the requested microservice process in association with the session identification token in a session that is persisted to a session repository identified by the session identification token; and cause the requesting client to replicate the persisted session in association with the session identification token.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
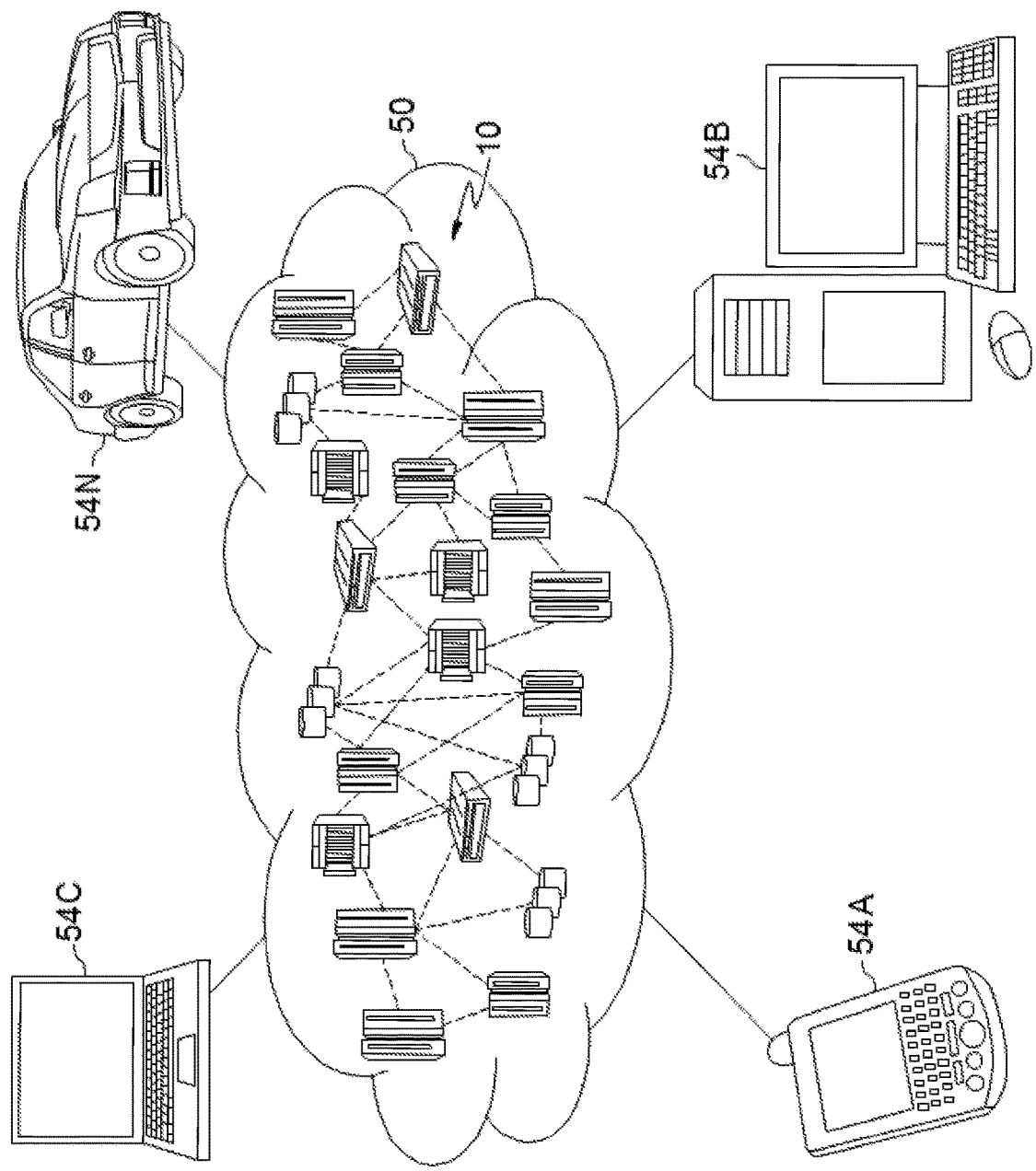
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
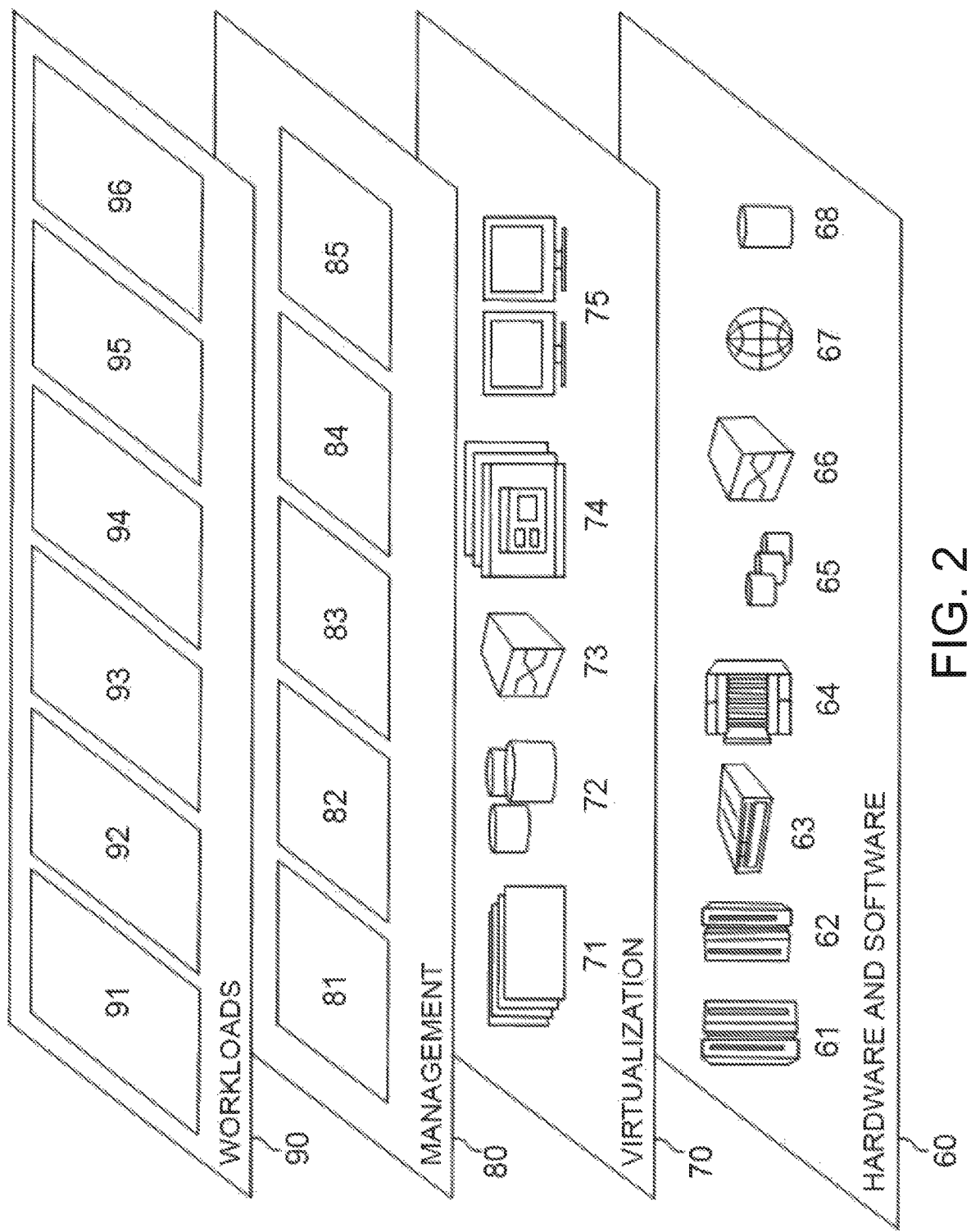
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 for federated session management according to the present invention, including as described with respect to FIG. 4 below.

Figure 3:
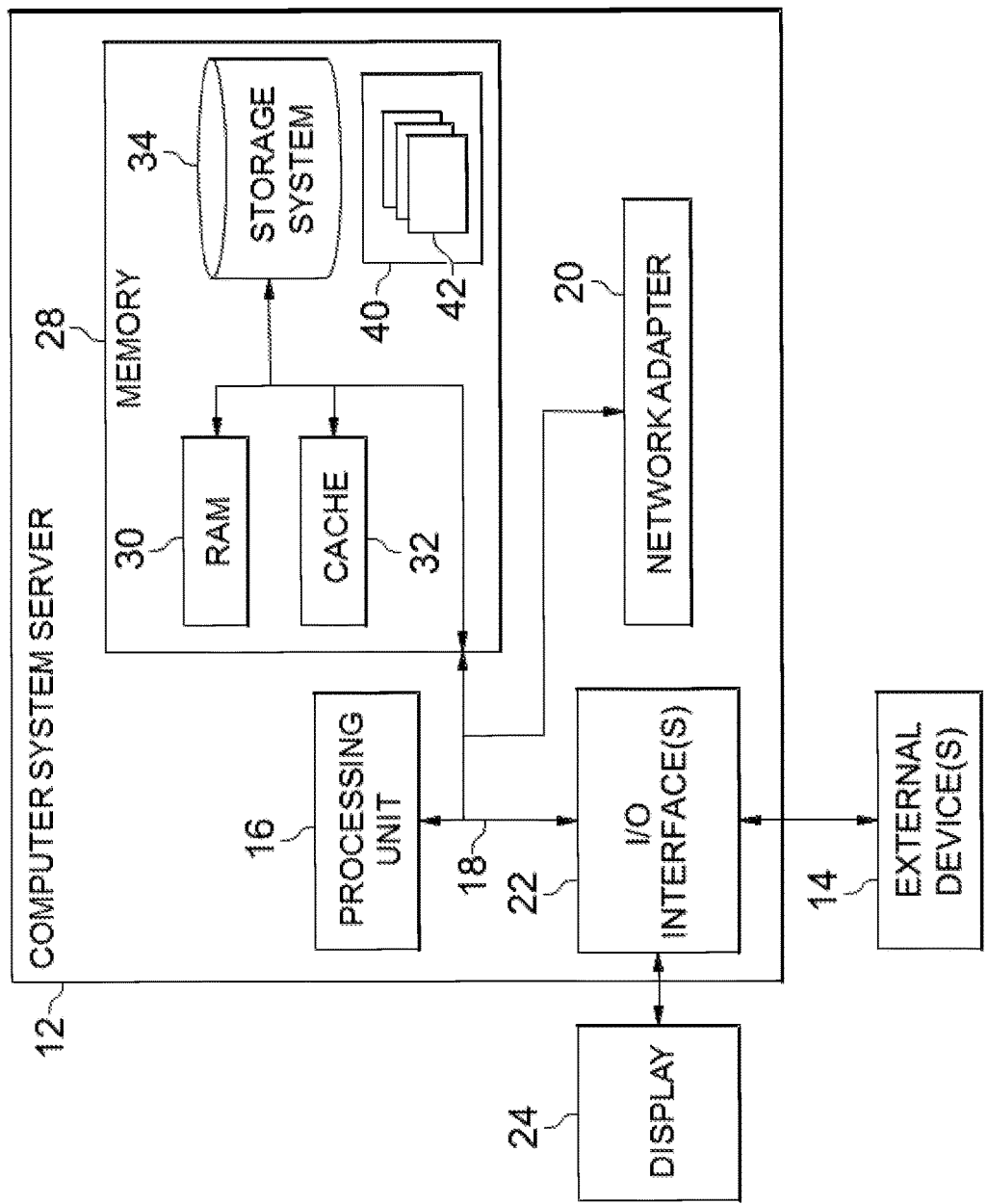
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In some conventional, prior art microservice implementations a single front end communicates with multiple back end hosting microservices, wherein sessions are managed at client-side and the session information is passed to the microservice processes on server-side. However, problems may arise when a client moves between a first of the back-end hosting microservice devices or channels to another (second), and an app at that second microservice device crashes, as the session information is generally lost in response to the crash of the app at the second microservice device.

Conventional, prior art multichannel architectures may provide multiple front-ends. Sessions replication tends to be adequately handled by run-time structures at the server-side when implemented with a single back-end or a clustered back-end environment (as they run in a homogenous environment on a cluster). However, problems may arise when an application uses other microservices hosted by different runtime that is not within the same cluster.

Moreover, combining microservice and multichannel architectures presents other problems. Handling a session in a multichannel front-end presents continuity challenges when a user moves from channel to channel. Sessions may be lost during restart operations in response to one front end application ("app") crashing or otherwise shutting down. Users may also be exposed to security and privacy losses via inadvertently storing confidential and sensitive data on a client device.

Figure 4:
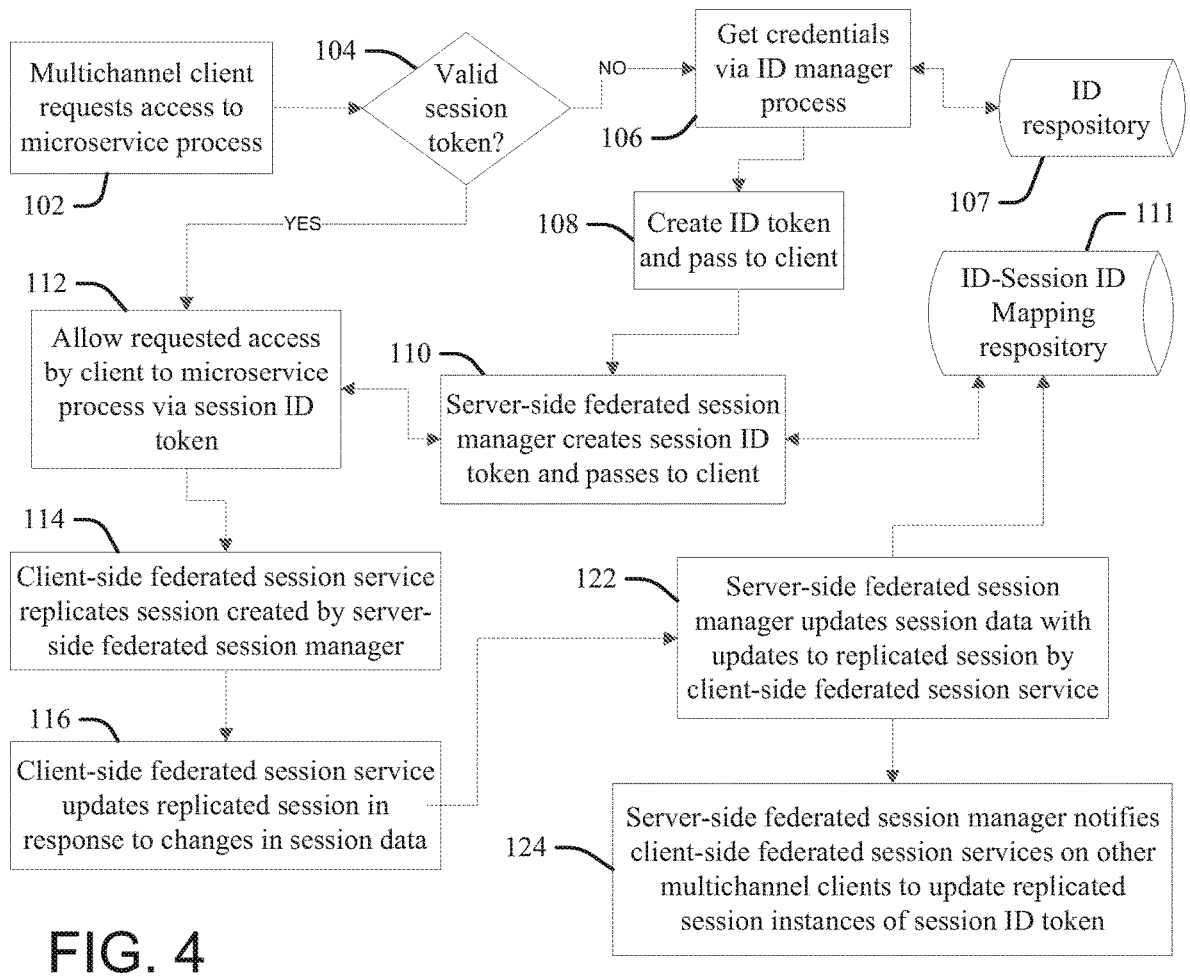
FIG. 4 is a flow chart illustration of an embodiment of the present invention.

FIG. 4 illustrates a process or system according to the present invention for federated session management. At 102 a server-side processor configured according to an aspect of the present invention (the "configured processor") receives a request for access to a microservice process from a user via a client, wherein the client is one of a plurality of different multichannel client devices (smart phone, laptop or desktop computer, tablet, etc.) that are each available to the user. The configured processor may be implemented in accordance with the computer system server 10 of FIG. 3, including as the cloud node 10 of FIG. 1, as described respectively above.

At 104 the configured processor determines whether the client making the request has a valid federated session token associated that is associated with a valid user identification credential (ID) for the user for this client. If not, at 106 the configured processor executes an identification manager process to verify or establish a unique user identification credential for the user for the requesting client as a function of a user identification repository 107 (storage device, cloud resource, etc.). A variety of authorization techniques may be practiced at 106, and illustrative but not limiting or exhaustive examples include Lightweight Data Access Protocol (LDAP), Automated Deployment Services (ADS) and Kerberos systems and method (a computer network authentication protocol that works on the basis of tickets to allow nodes communicating over a non-secure network to prove their identity to one another in a secure manner).

At 108 the configured processor creates a client ID token and passes it to the requesting client, the client ID token providing a credential that establishes that the user has properly logged in to the requesting client with a valid password for use of a unique user ID.

At 110 the configured processor creates a federated session ID token for the request that defines a microservice session for the request, maps the session ID token to the ID token within an ID-session ID mapping repository 111, and passes the session token to the requesting client in association with client ID token created at 108.

Mapping at 110 comprises mapping or linking the federated session ID token to other client ID tokens previously created for the user for the use of different ones of the multichannel clients. For example, a first client used by the user for a microservice request may be a smart phone that communicates the request at 102 from a public WiFi hot spot, wherein the unique user client ID token generated at 108 for an application ("app") executing on the smart phone is "Fred123", as verified by the user via entry of a password associated with the user ID in the ID repository 107. Another, second of the multichannel clients available to the user to make the same microservice request at 102 (for example, in response to ending a session initiated by the first client before satisfaction of the microservice request) is a laptop located on a private, business local area network, wherein the unique user ID for this user for an application executing on the laptop is "Fred@work," as verified by the user via entry of a password associated with the user ID in the ID repository 107. The configured processor eithers map each of the different "Fred123" and "Fred@work" user IDs to the same session token; or maps each to a single sign-on (SSO) ID of the user (for example, "FREDS-SSO32") to the create session token, wherein each of the different "Fred123" and "Fred@work" user IDs are mapped to the SSO for the user.

At 112 the configured processor allows the requested access by the client to the server-side microservice process in association with the session token (thereby defining a microservice session for the requested process).

At 114 the configured processor causes a client-side federated session manager application executing on the requesting client to replicate the server-side session, to thereby generate a replicated session client-side in association with the session token.

At 116 the client-side federated session manager application updates the replicated session at the client in response to changes in the session data at the client during the access granted to client to the microservice process.

In response to updates to the replicated session client-side at 116, at 122 the configured processor updates the session data of the session token with the updates made to the replicated session at client-side, and saves the updates in association with the client user ID token (or SSO token) within the ID-session ID mapping repository 111.

At 124 the configured processor passes to (notifies) federated session manager applications of each of the other clients of the plurality of multichannel clients of the updates to the session data at 120, in order to instigate corresponding changes to their own replicated session instances that are associated with (identified with) the ID session token.

Figure 5:
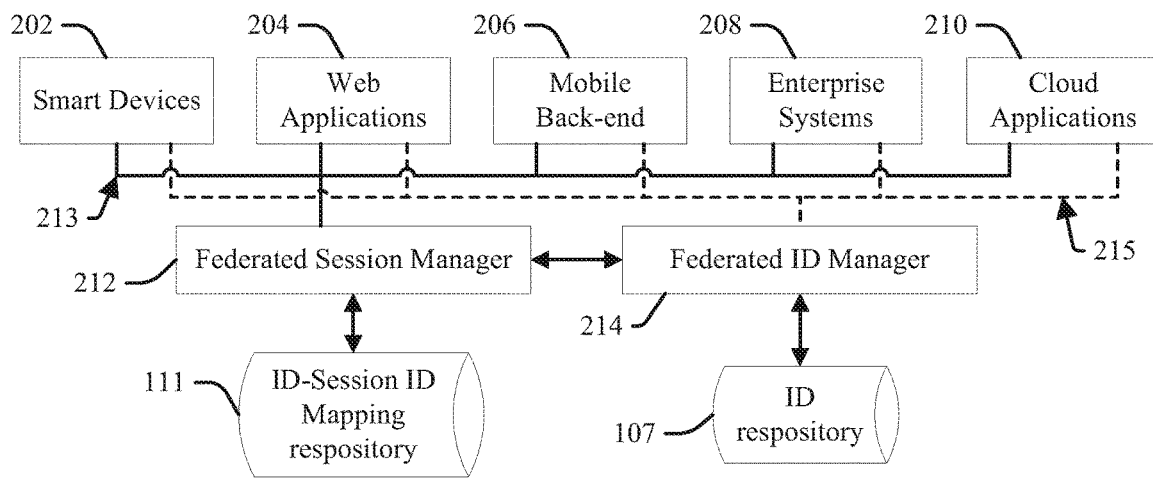
FIG. 5 is a block diagram illustration of an embodiment of the present invention.

FIG. 5 illustrates an implementation of an aspect of the present invention. Microservices may be accessed by one or more user smart devices 202 (mobile devices, personal computers, kiosks, devices having Internet Of Things (IoT) components, etc.); web-based applications 204 (internet browsers, social network applications, etc.); mobile device back-end server applications 206 (for example, cellular service provider applications); enterprise systems 208; and cloud applications or services 210.

Enterprise applications executing client-side in the federated ID manager component 214 use Security Assertion Markup Language (SAML) an extensible mark-up language (XML) based, open-standard data format for exchanging authentication and authorization data between identity providers and service providers via federated identity communications (for example, via SAML).

Upon successful authentication by the federated ID manager 214 the Federated Session Manager (FSM) 212, a server side infrastructure that carries all the session ID mapping and session data, creates a session having a unique FSM session ID and links the FSM session ID with the user ID verified by the federated ID manager 214, and preferable with a single sign-on (SSO) ID the user. The Federated Session Manager (FSM) 212 instigates (via federated session service client-side infrastructure communications 213) session replications client-side on the multichannel clients 202, 204, 206 208 and 210 (via middleware or a client app) to keep the session up-to-date and replicated across the client-side instances. Thus, via sharing the lined SSO identity and FSM session ID, federated session manager service instances are evoked within each of a plurality of different microchannel client-side applications, acting as agents for the Federated Session Manager 212 and thereby enabling the Federated Session Manager 212 to handle session management for each of the multichannel clients.

The Federated Session Manager 212 enables a user to persist the session on logout (via data stored in the ID-Session ID Mapping repository 111, and within the replicated session data at each of the multichannel clients), so that the next time the user logs in to use a microservice (via the federated ID manager component 214) using an ID of any of the different multichannel clients 202, 204, 206 208 and 210 that is linked or mapped to the session ID, the session is restored by the Federated Session Manager 212.

Aspects of the present invention thereby provide an open standard-based federated session management system that supports future microservices back-end architectures and multi-channel front-end clients. The Federated Session Manager 212 and federated ID manager component 214 generally communicate directly using secured SSO channel mechanisms, including SAML and other XML HTTP protocols).

Aspects provide advantages over prior art cluster-based, server-side session management systems, which require a same server platform to manage and replicate sessions across the cluster, such as Java® Enterprise Edition (JAVA EE or J2EE) application servers that define core sets of Application Programming Interface (API) features). (JAVA and all JAVA-based trademarks and logos are trademarks or registered trademarks of Oracle and/or its affiliates.) While some prior art multichannel structures provide for session management at the front-end, via using some type of cloud solution for continuity between multiple devices and channels, such approaches do not provide a standard back-end way of federating all of the front-end session data from the different multichannels so that multiple servers, platforms and runtime instances are running microservices are enabled to manage the session data.

In execution, a federated session service is installed or built in each of microservice platform or runtime instances according to aspects of the present invention. When the user logs in to any of the multichannel client system options, using any SSO method, a federated session manager creates a token for the user (for example, a SAML token), wherein a session is created on the federated session manager and a unique session ID token is passed along with the token (and optionally other, most-used data along with the session ID token, in order to improve efficiencies by reducing the round trips) on a secured channel (for example, HTTPS).

Federated session services according to the present invention sync up with the session manger and handle the session data. The session data may be synced up at real-time (for example, using database integrity and replication techniques) to ensure parallel updates to the data. Thus, when the user logs in through another channel, the session is restored to the respective session service, from the federated session manager. The session data is also persisted, so that when the user logs in next time the session data can be restored in any channel from which the user logs in.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for federated session management, comprising executing on a computer processor:

in response to receiving a first request for access to a microservice process from a user via a requesting first client, verifying a unique user identification credential for the user for the requesting first client;

in response to verifying the unique user identification credential for the user for the requesting first client, creating a first client identification token and passing the first client identification token to the requesting first client;

mapping a session identification token for the first request for access to the microservice process to the first client identification token, wherein the session identification token defines a microservice session for a request;

passing the session identification token to the requesting first client;

enabling requested access by the requesting first client to the requested microservice process in association with the session identification token in a session that persists to a session repository identified by the session identification token;

causing the requesting first client to replicate the persisted session in association with the session identification token which replicates session data between the requesting first client and the session repository;

in response to receiving a second request for access to the microservice process from the user via a requesting second client, verifying a unique user identification credential for the user for the requesting second client, wherein the second request for access to the microservice process is previous to the first request for access for the microservice process;

in response to verifying the unique user identification credential for the user for the requesting second client, creating a second client identification token;

creating the session identification token for the second request;

mapping the session identification token to the second client identification token;

enabling requested access by the second client to the microservice process in a federated association with the session identification token in the session that persists to the session repository identified by the session identification token;

wherein the step of mapping the session identification token to the first client identification token comprises mapping the session identification token to the second client identification token which comprises the second client request for access to the microservice process from the user via the second client; and wherein enabling requested access by the requesting first client to the requested microservice process in the federated association with the session identification token comprises restoring the persisted session from the session repository to the requesting first client and enabling the requested access by the requesting first client to the requested microservice process pursuant to the persisted session from the second client.

2. The method of claim 1, further comprising:

integrating computer-readable program code into a computer system comprising a processor, a computer readable memory in circuit communication with the processor, and a computer readable storage medium in circuit communication with the processor; and wherein the processor executes program code instructions stored on the computer-readable storage medium via the computer readable memory and thereby performs the steps of verifying the unique user identification credential for the user for the requesting first client in response to receiving the first request for access to the microservice process from the user via the requesting first client, creating the first client identification token in response to verifying the unique user identification credential for the user for the requesting first client, mapping the session identification token to the first client identification token, passing the session identification token to the requesting first client, enabling the requested access by the requesting first client to the requested microservice process in association with the session identification token in the session that persists to the session repository identified by the session identification token, and causing the requesting first client to replicate the persisted session in association with the session identification token between the requesting first client and the session repository.

3. The method of claim 2, wherein the computer-readable program code is provided as a service in a cloud environment.

4. The method of claim 1, wherein the step of mapping the session identification token to the first client identification token and the second client identification token comprises mapping the session identification token to a single sign-on identification credential of the user, wherein the first client identification token and the second client identification token are mapped to the single sign-on identification credential.

5. The method of claim 1, further comprising:

the restoring the persisted session from the requesting first client via the session repository enabling requested access by the second client of the second request to the requested microservice process pursuant to the persisted session, wherein the requesting first client and the requesting second client are different, and the session identification token is common to both the first request and the second request.

6. The method of claim 1, wherein the steps of passing the session identification token to the requesting first client mapped to the first client identification token and causing the requesting first client to replicate the persisted session in association with the session identification token are performed via security assertion markup language (SAML) protocols.

7. The method of claim 1, further comprising:

causing a client-side federated session manager application of the requesting first client to update the replicated session in the session repository in response to changes in session data at the requesting first client during the enabled requested access by the requesting first client to the requested microservice process in association with the session identification token.

8. The method of claim 5, further comprising:

updating session data of the session persisted to the session repository and identified by the session identification token with updates made to the replicated session at client-side by the requesting first client; and passing the updated session data of the session persisted to the session repository and identified by the session identification token to the second client to cause the second client to correspondingly update data of the persisted session replicated at the second client in association with the session identification token.

9. The method of claim 1, wherein the session identification token is same across a plurality of clients, each client creating a separate channel of access to the microservice process;

wherein session data is replicated between the plurality of clients and the session repository; and wherein the session identification token is mapped in a federated non-clustered arrangement with the microservice process.

10. A system comprising:

a processor;

a computer readable memory in circuit communication with the processor; and a computer readable storage medium in circuit communication with the processor;

wherein the processor executes program instructions stored on the computer-readable storage medium via the computer readable memory and when executed by the processor:

verifies a unique user identification credential for a requesting user for a requesting first client in response to receiving a first request for access to a microservice process from the requesting user via the requesting first client;

creates a first client identification token and passing the first client identification token to the requesting first client in response to verifying the unique user identification credential for the user for the requesting first client;

maps a session identification token for the first request for access to the microservice process to the first client identification token, wherein the session identification token defines a microservice session for a request;

passes the session identification token to the requesting first client;

enables requested access by the requesting first client to the requested microservice process in association with the session identification token in a session that persists to a session repository identified by the session identification token;

causes the requesting first client to replicate the persisted session in association with the session identification token which replicates session data between the requesting first client and the session repository;

in response to receiving a second request for access to the microservice process from the user via a requesting second client, verifies a unique user identification credential for the user for the requesting second client, wherein the second request for access to the microservice process is previous to the first request for access for the microservice process;

creates a second client identification token in response to verifying the unique user identification credential for the user for the requesting second client;

creates the session identification token for the second request;

maps the session identification token to the second client identification token;

enables requested access by the second client to the microservice process in a federated association with the session identification token in the session that persists to the session repository identified by the session identification token;

maps the session identification token to the second client token which comprises the second client request for access to the microservice process from the user via the second client; and restores the persisted session from the session repository to the requesting first client and enabling the requested access by the requesting first client to the requested microservice process pursuant to the persisted session from the second client.

11. The system of claim 10, wherein the processor executes the program instructions stored on the computer-readable storage medium via the computer readable memory and thereby:

maps the session identification token to the first client identification token and the second client identification token by mapping the session identification token to a single sign-on identification credential of the user, wherein the first client identification token and the second client identification token are mapped to the single sign-on identification credential.

12. The system of claim 10, wherein the processor executes the program instructions stored on the computer-readable storage medium via the computer readable memory and thereby:

restores the persisted session from the requesting first client via the session repository and enables requested access by the second client of the second request to the requested microservice process pursuant to the persisted session, in response to receiving the second request for access to the microservice process from the user via the second client of the second request that is identified by a second client identification token that is mapped to the session identification token, wherein the requesting first client and the requesting second client are different, and the session identification token is common to both the first request and the second request.

13. The system of claim 10, wherein the processor executes the program instructions stored on the computer-readable storage medium via the computer readable memory and thereby:

passes the session identification token to the requesting first client mapped to the first client identification token and causes the requesting first client to replicate the persisted session in association with the session identification token via security assertion markup language (SAML) protocols.

14. The system of claim 10, wherein the processor executes the program instructions stored on the computer-readable storage medium via the computer readable memory and thereby:

causes a client-side federated session manager application of the requesting first client to update the replicated session in the session repository in response to changes in session data at the requesting first client during the enabled requested access by the requesting first client to the requested microservice process in association with the session identification token.

15. A computer program product for federated session management, the computer program product comprising:

a computer readable storage medium having computer readable program code embodied therewith, wherein the computer readable storage medium is not a transitory signal per se, the computer readable program code comprising instructions 48-F when executed by a processor that cause the processor to:

verify a unique user identification credential for a requesting user for a requesting first client in response to receiving a first request for access to a microservice process from the requesting user via the requesting first client;

create a first client identification token and passing the first client identification token to the requesting first client in response to verifying the unique user identification credential for the user for the requesting first client;

map a session identification token for the first request for access to the microservice process to the first client identification token, wherein the session identification token defines a microservice session for a request;

pass the session identification token to the requesting first client;

enable requested access by the requesting first client to the requested microservice process in association with the session identification token in a session that persists to a session repository identified by the session identification token;

cause the requesting first client to replicate the persisted session in association with the session identification token, which replicates session data between the requesting first client and the session repository;

in response to receiving a second request for access to the microservice process from the user via a requesting second client, verify a unique user identification credential for the user for the requesting second client, wherein the second request for access to the microservice process is previous to the first request for access for the microservice process;

create a second client identification token in response to verifying the unique user identification credential for the user for the requesting second client;

create the session identification token for the second request;

map the session identification token to the second client identification token;

enable requested access by the second client to the microservice process in a federated association with the session identification token in the session that persists to the session repository identified by the session identification token; and map the session identification token to the second client token which comprises the second client request for access to the microservice process from the user via the second client; and restore the persisted session from the session repository to the requesting first client and enabling the requested access by the requesting first client to the requested microservice process pursuant to the persisted session from the second client.

16. The computer program product of claim 15, wherein the computer readable program code instructions for execution by the processor further cause the processor to:

map the session identification token to the first client identification token and the second client identification token by mapping the session token to a single sign-on identification credential of the user, wherein the first client identification token and the second client identification token are mapped to the single sign-on identification credential.

17. The computer program product of claim 15, wherein the computer readable program code instructions for execution by the processor further cause the processor to:

restore the persisted session from the requesting first client via the session repository and enable requested access by the second client of the second request to the requested microservice process pursuant to the persisted session, in response to receiving the second request for access to the microservice process from the user via the second client of the second request that is identified by a second client identification token that is mapped to the session identification token, wherein the requesting first client and the requesting second client are different, and the session identification token is common to both the first request and the second request.

* * * * *